United States Patent
Blundy

(10) Patent No.: US 7,413,433 B2
(45) Date of Patent: Aug. 19, 2008

(54) LAMINANT HOT RUNNER MANIFOLD

(75) Inventor: John D. Blundy, White Lake, MI (US)

(73) Assignee: Incoe Corporation, Troy, MI (US)

( * ) Notice: Subject to any disclaimer, the term of this patent is extended or adjusted under 35 U.S.C. 154(b) by 263 days.

(21) Appl. No.: 11/163,961

(22) Filed: Nov. 4, 2005

(65) Prior Publication Data

US 2007/0104824 A1    May 10, 2007

(51) Int. Cl.
  *B29C 45/22* (2006.01)
(52) U.S. Cl. .................. 425/572; 264/328.8
(58) Field of Classification Search ............ 425/572, 425/549; 264/328.8
  See application file for complete search history.

(56) References Cited

U.S. PATENT DOCUMENTS

| | | | |
|---|---|---|---|
| 5,227,179 A | * | 7/1993 | Benenati ............ 425/570 |
| 5,496,168 A | * | 3/1996 | Renwick ............ 425/572 |
| 5,804,231 A | | 9/1998 | Prophet |
| 6,749,422 B2 | | 6/2004 | Yu |
| 2003/0098140 A1 | | 5/2003 | Yu |
| 2004/0191358 A1 | | 9/2004 | Gellert |
| 2004/0258796 A1 | | 12/2004 | Fairy |

OTHER PUBLICATIONS

Colvin and Stanley, American Machinists' Handbook, 1940, McGraw-Hill Book Company pp. 722-727.*

* cited by examiner

*Primary Examiner*—Tim Heitbrink
(74) *Attorney, Agent, or Firm*—John A. Artz; Dickinson Wright PLLC

(57) ABSTRACT

A two-piece hot runner manifold with plastic flow channels formed as recesses in the two mating surfaces. One or more mating structures, such as posts and sockets, ridge and groove configurations, or the like, are provided along the mating surfaces of the two mating manifold members. A bonding material, such as bronze, can be used to hold the two pieces of the hot runner manifold together. Cross pin members are preferred for use in securing the two mating manifold members together.

23 Claims, 3 Drawing Sheets

LAMINANT HOT RUNNER MANIFOLD

TECHNICAL FIELD

The present invention relates to hot runner manifolds used in plastic injection molding, and more particularly to improved two-piece hot runner manifolds.

BACKGROUND OF THE INVENTION

Hot runner manifolds are commonly used in the injection molding of plastic materials. The manifolds are used to transport the molten plastic material from an injection molding machine to various bushings or nozzle drops. The manifolds have passageways or channels in them for transport of the molten plastic material to the bushings or nozzles, and finally to the mold cavity. Heater members, or elements, are contained within or on the manifold and maintain the plastic material in the manifold at the requisite temperature for molding.

Conventional manifolds typically are made from a single block or piece of metal material. The channels or passageways in these manifolds are typically formed by drilling, such as by use of a gun drill. It is difficult to grind or smooth the interior of flow channel holes bored by gun drills, however, and the corners formed at junctions where two or more bored holes meet create additional problems. Sharply angled corners hinder the smooth flow of the plastic materials and any imperfections or defects in the smoothness of the flow channels can create distress in the material and may retain remnants of material creating difficulties in either the quality of the finished products or in cleaning the manifold after completion of the molding process.

Two-piece hot runner manifolds have been developed in an attempt to solve some of the above-identified problems. In the two-piece structures, the flow channels are formed by mating semi-circular recesses in each of the two pieces of manifold. When the two pieces are mated together, the two recesses form elongated circular flow channels.

Problems have developed with two-piece manifolds relative to securely holding the two pieces together during the molding process and in providing a smooth channel, particularly where the two surfaces of the manifold come together. Welding or bolting the two pieces of the manifold together have not always produced satisfactory results. Also, the use of a bonding or bronzing process to hold two pieces of the manifold together has not always worked satisfactorily. The bronze material, for example, can lead to protrusions of material at the parting line in the flow channels for the molten plastic. Also, voids can exist where the bronze material is not present uniformly along the parting line. Either condition can cause plastic material to be trapped in the channels producing undesirable results in the end products which are molded.

Thus, a need exists for a hot runner manifold which is an improvement over single block manifolds due to their limitations, as well as an improvement over two-piece manifolds due to their limitations. It is thus desirable and an object of the present invention to provide an improved manifold structure which eliminates or minimizes the problems mentioned above with known one and two-piece manifold structures.

SUMMARY OF THE INVENTION

In accordance with the present invention, a two-piece hot runner manifold is provided. The two portions or members of the manifold structure have mating structures, such as posts and sockets, ridges and grooves, or steps, which prevent any bronzing or other bonding material positioned between the two members to adversely affect the parting line at the flow channels or passageways. Recesses are provided for the bonding material.

With the present invention, the parting lines where the plastic melt channels meet can be precisely machined enabling the mating of the parting line to be smooth. The mating structures prevent any bronzing or other material positioned between the two members to adversely affect the parting lines at the flow channels or passageways.

The two manifold members can be held together in any conventional manner, such as by bolts, bronzing or welding, but preferably also include cross-pin members. The pin members are positioned in channels which pass through both of the mold members preventing them from separating. Some or all of the mating structures, such as posts and sockets, grooves and ridges, or steps, can be cross-pinned.

In one embodiment, the two manifold members are held together simply by the cross-pin members. Bonding materials are not utilized. In another embodiment, the two manifold members are held together simply by the bronzing or bonding material which is positioned adjacent the mating structures. When bonding materials are utilized, the heater members can be positioned in a conventional manner.

When cross-pin members are utilized, it is also possible to utilize pin members with a different coefficient of expansion or expansion rate than the material used for the manifold members. As a result, increased expansion of the cross-pin members will increase the holding strength of the cross pins and further aid in securely holding the two mold members together.

In some embodiments whose cross-pin members are utilized without bonding materials, the present invention allows the manifold heating elements to be positioned closer to the plastic melt channels. This improves the distribution of the radiant heat as well as improving the processing of the plastic materials, and may improve heater element life.

These and other objects and features of the present invention will become apparent from the following description of the preferred embodiments, together with review of the associated drawings and appended claims.

BRIEF DESCRIPTION OF THE DRAWINGS

Embodiments of the present invention will now be described more fully with reference to the accompanying drawings in which similar reference numbers indicate similar structure.

DESCRIPTION OF THE PREFERRED EMBODIMENT(S)

Figure 1:
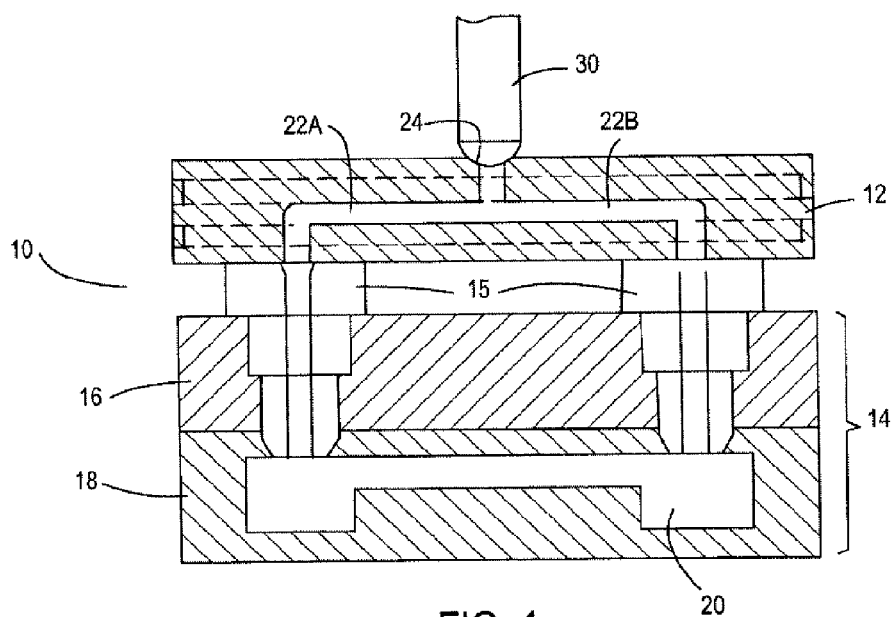
FIG. 1 is a schematic diagram of a conventional plastic injection molding system.

FIG. 1 is a schematic diagram of a conventional plastic injection molding system 10 which illustrates some of the basic components utilized with the present invention. Plastic injection molding processes are used to mold plastic products and components that are in wide use today. In such processes, the plastic material is melted in an injection molding machine and then injected from the machine through a nozzle into a cavity in a mold or tool. The mold cavity is formed or machined in the shape of the part or component to be produced. The plastic material is typically injected through a bushing or nozzle into the mold cavity. The mold or tool itself is cooled by conventional cooling means in order to harden the plastic material once the mold cavity is filled.

Once the plastic material in the mold cavity is cooled and hardened sufficiently to be self-supporting, the mold is opened and the part is removed. Thereafter, the mold is closed and another cycle is initiated.

As shown in FIG. 1, the plastic material is ejected through nozzle 30 which is attached to an injection molding machine (not shown). The plastic material passes through passageways or flow channels 22A and 22B in hot runner manifold 12. The plastic material passes through bushings or nozzles 15 into mold cavity 20 in the mold 14. The mold 14 is formed of two mold members or sections 16 and 18. As indicated above, in conventional molding operations today, the hot runner manifold 12 can either be made from a single block of metal material or provided in two pieces. In either embodiment, the manifold is heated by a plurality of heater members or the like in order to maintain the plastic material in the passageways 22A and 22B in a molten condition. The heating elements are typically positioned inside the manifold or on the outside surfaces—or both. Also, preferably, the bushings or nozzles 15 are heated, thus maintaining the plastic material in a molten condition throughout the entire passage to the mold cavity 20.

Figure 2:
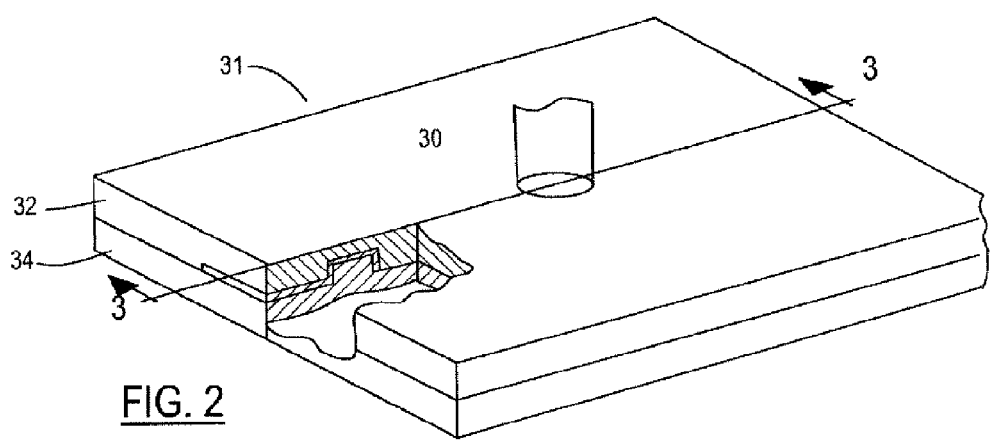
FIG. 2 is a schematic perspective view of a two-piece hot runner manifold in accordance with the present invention.
Figure 3:
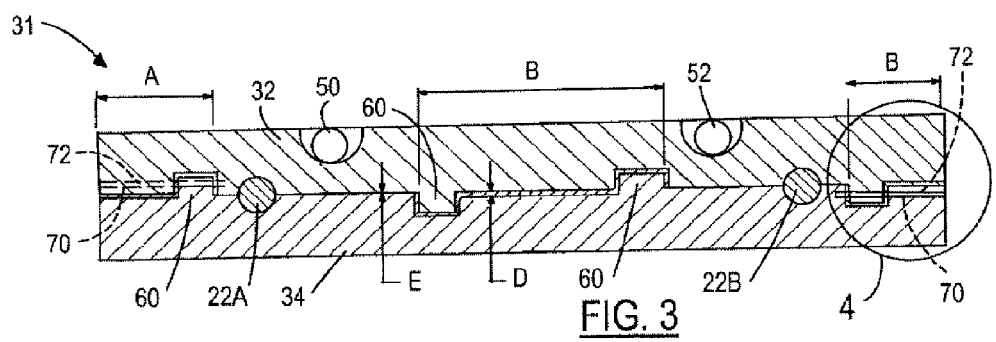
FIG. 3 is a cross-sectional view of the hot runner manifold as shown in FIG. 2, the cross section being taken along lines 3-3 in FIG. 2.

A two-piece hot runner manifold in accordance with an embodiment of the present invention is shown in FIG. 2 and indicated generally by the reference numeral 31. The manifold consists of two manifold members 32 and 34 which are held securely together. The plastic material is injected into a mold cavity through the hot runner manifold 31 as described above. Plastic material is injected into the hot runner manifold by nozzle 30 which is attached to an injection molding machine (not shown). The plastic material injected into the manifold 31 passes through passageways 22A and 22B which are machined in the manifold members 32 and 34. The heater members 50 and 52 are positioned in this embodiment on the outside surface of the manifold 31. Grooves as shown for placement of the heater members can be provided as desired. As shown in FIG. 3, the flow channels 22A and 22B are formed by two semi-circular channels which are machined or otherwise formed in the members 32 and 34. With the present invention, the passageways or flow channels 22A and 22B can have any particular shape and be machined with curved configurations as needed or desired.

Figure 4:
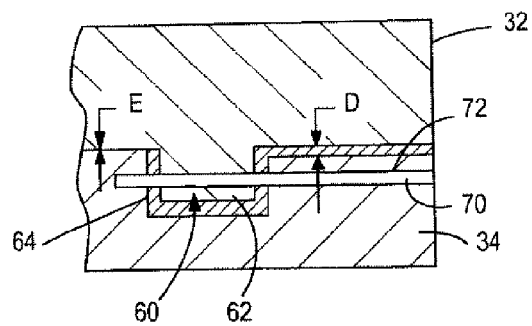
FIG. 4 is an enlarged view of a portion of the hot runner manifold as shown in FIG. 3.

At the surfaces adjacent the flow channels 22A and 22B, the mating surfaces of the manifold members 32 and 34 are made as finished and planar as possible. Thus, the dimension "E" indicated in FIGS. 3 and 4, should be as close to zero as possible. In that manner, plastic material flowing through the passageways 22A and 22B will not leak into the parting lines but be maintained within the circumference of the flow channels.

Also, in accordance with the present invention, a plurality of mating ridge and groove members, or steps 60, are provided. The steps are provided along the length of the mating surfaces between the mold members 32 and 34 as shown. The steps include a protruding ridge member 62 and a mating groove or cavity member 64 (see FIG. 4). As indicated, a plurality of mating steps are typically provided, although the precise number depends on the size and shape of the hot runner manifold provided.

In the areas on the surfaces of the mold members 32 and 34 in which the steps are provided. In accordance with one embodiment of the invention, the surfaces are machined a slight distance apart in order to provide space for a bonding material, such as a bronzing material or the like. These distances as represented by the distance "D" in FIGS. 3 and 4 and preferably are on the order of 0.001-0.010 inches.

When the two mating manifold members 32 and 34 are positioned together, the bonding material, such as bronze, is positioned in the areas designated A, B, and C in FIG. 3 and in which the steps are positioned. This allows the bonding material to spread out and firmly bond the two mold members 32 and 34 together and yet at the same time allow the main surfaces at the areas where the flow channels and heater elements are positioned to remain in firm contact. The bonding material typically is a metal material and provided in sheets. The sheets have a thickness substantially the same as or slightly less than dimension D. Other bonding materials include copper.

Although it is believed that the bronzing or bonding material itself may be sufficient to hold the two manifold members 32 and 34 together, it is also possible to employ conventional mechanisms, such as bolts or welding, in order to further insure that the two manifold members are maintained in their mated condition during the molding operation. In accordance with another embodiment of the invention, the two manifold members 32 and 34 can be held together in the manner shown in FIGS. 3, 4 and 5.

In FIG. 3, cross pin members 70 are positioned in channels or bores 72 formed in the manifold members 32 and 34 as shown. The channels are drilled through the protruding ridges or steps such that when the pins are positioned in the channels, the pins mate the two manifold members together.

The pins preferably pass through more than one ridge or step for increased retention and holding abilities. Preferably, a cross-pin member is positioned through every post/socket, groove/ridge or step. This would provide increased holding force holding the two manifold members together.

In another embodiment of the invention, the cross pin members 70 can be provided with a different rate of expansion, and thus a different coefficient of expansion, than the metal material which is used to form the manifold members 32 and 34. In other words, the metal materials used to form the cross pin members 70, which preferably is a metal material, have a coefficient of expansion which allows the pin members to expand more than the material in which the manifold members 32 and 34 are formed. Thus, when the hot runner manifold 31 in accordance with the present invention is utilized, the cross pin members 70 will expand when the system is heated, thus more firmly holding the manifold members together and increasing the holding strength of the cross pin members.

Figure 5:
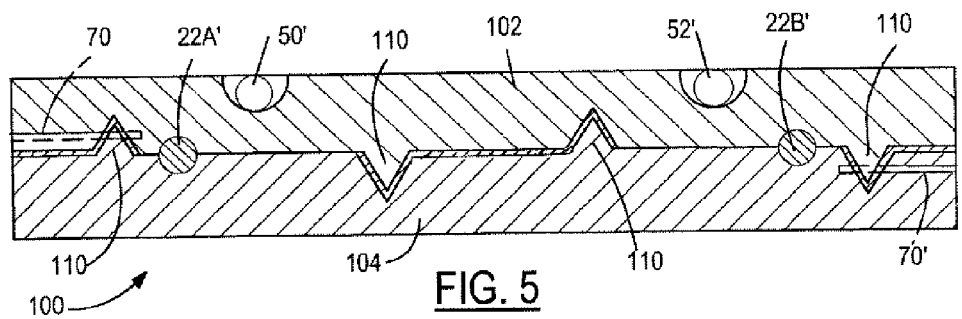
FIG. 5 illustrates an alternate embodiment of the invention.

An alternate embodiment of the present invention is shown in FIG. 5. In this embodiment, the hot runner manifold 100 includes mating manifold members 102 and 104. The step members used to hold the manifold members together are formed in the shape of triangular ridges and grooves 110. In this embodiment, the plastic melt flow channels are indicated by the reference numerals 22A' and 22B', and the heater elements by the reference numerals 50' and 52'. In addition, the cross pin members are indicated by the reference numerals 70'.

The alternate embodiment illustrated in FIG. 5 illustrates that the precise shape of the step members utilized with the present invention to mate and hold together the two-piece pieces of the hot runner manifold in accordance with the present invention can have virtually any cross-sectional size and shape which is obvious to persons of ordinary skill in the art. Thus, the invention is not limited to any particular size and shape of mating step members or mating ridge and groove members.

As shown in FIGS. 3 and 5, the heater members or elements are positioned on the external surfaces of the manifolds, and they are positioned after the bonding process has been completed. In this manner, the heat of the bonding process will not adversely affect the heating elements. Of course, it is found that heater elements are not adversely affected in this manner, then it may be possible to position the heater members inside the manifold (such as shown in FIG. 6), preferably in semi-circular channels machined or formed in the two manifold members as shown.

It is also possible to include pipe members in the plastic melt flow channels 22A and 22B in order to improve the flow of plastic material through them. This is shown, for example, in U.S. Pat. No. 6,749,422, the disclosure of which is hereby incorporated by reference.

In addition, plate members can be utilized along with the channel pipe members in order to improve the heat distribution within the manifold. The plate members can be curved copper members positioned on one or more sides of the pipe members in the flow channels 22A and 22B. The copper plates can be of the type, for example, disclosed in U.S. Pat. No. 6,749,422, the disclosure of which is again incorporated herein by reference.

Figure 6:
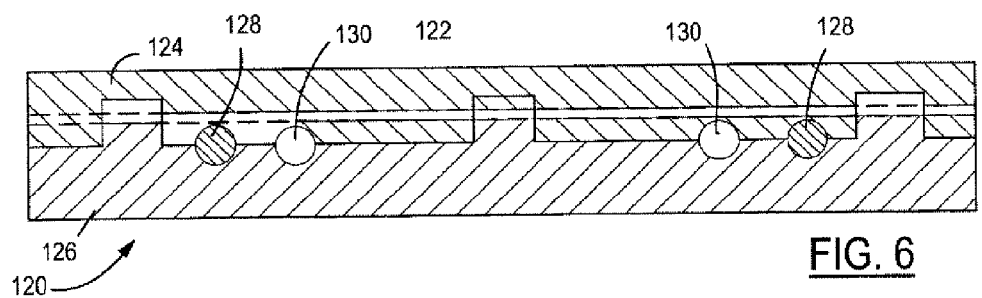
FIGS. 6 and 7 illustrate other preferred embodiments of the invention.

One embodiment 120 of the present invention is shown in FIG. 6 and simply uses cross-pin members 122 to hold the two mating manifold members 124, 126 together. A bonding material is not utilized. With this embodiment, recesses for the bonding materials are not needed and the two manifold halves are machined to close tolerances throughout their mating surfaces. The plastic channels 128 are provided at the intersection of the two manifold members in the same manner as described above, and the cross-pin members 122 extend across most or all of the length or width of the manifold.

The passageways or channels 130 for the heating elements or members are machined in the mating surfaces of the mold members 124 and 126 in any conventional manner. With this embodiment, the heater members are preferably positioned immediately adjacent the plastic flow channels 128 thus maintaining the material in the flow channels at a more consistent and uniform temperature. By placing the heater elements closer to the plastic melt channels and in the middle of the manifold members, the distribution of radiant heat is improved, as well as the processing of the plastic material itself. In addition, the life of the heater members may be increased.

Figure 7:
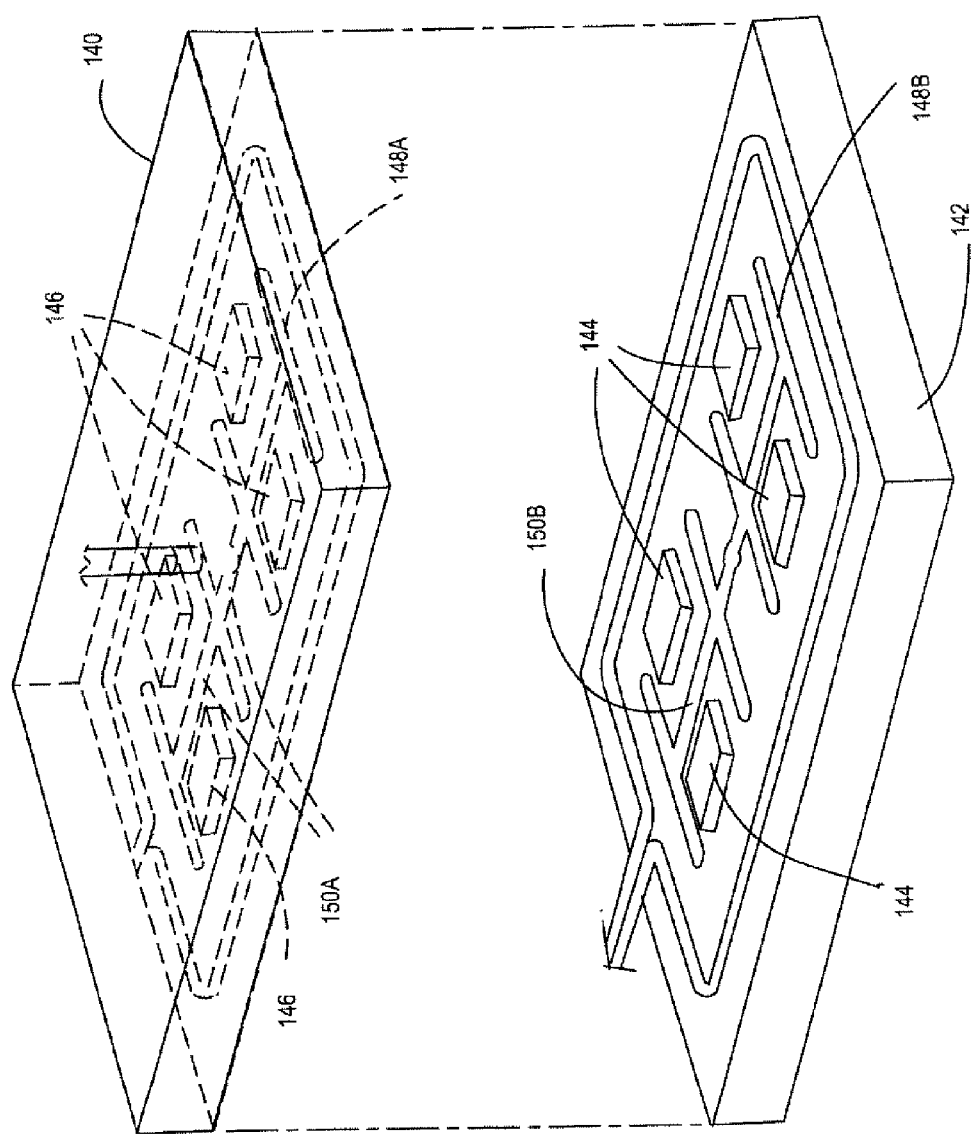

FIG. 7 illustrates another form of interlocking mechanism for holding two manifold members together. In this embodiment, two manifold members 140, 142 have a plurality of mating posts 144 and sockets 146. (If a plurality of mating posts and socket members are provided, the two mating manifold members could resemble a waffle iron or the like.)

The plastic resin channels 148 A, B, and 150 A, B are formed in the two mating surfaces and pass around the posts and sockets in order to carry the plastic material from the molding machine to the sprue bushings and mold cavities. Recesses (not shown) between the post members and sockets are provided for the bronzing or other bonding material so that the mating surfaces adjacent the plastic flow channels or passageways can be flush with each other, as pointed out above.

FIG. 7 illustrates the heater members in channels or grooves 160 also on the mating surfaces. However, as indicated above, if the bonding process will adversely affect the heater members, then the heater channels and heater members should be provided on the external surfaces of the manifold in the manner shown in FIGS. 3 and 5 above.

It also should be pointed out that the terms "ridge members" and "post members" are not to be limiting, nor are the terms "recess" or "socket members." In accordance with the present invention, one or more protrusions or raised members are formed or provided on the mating surface of one of the two manifold members, regardless of the term or words used to describe it, and regardless of the size, shape or configuration of the raised member. The raised or projecting member can be a post, knob, rod, cylinder, boss, square, hexagon or any shape, and be provided any desired distance or height above the mating surface (although 1-6 inches would be typical). Similarly, the hollow cavity mating member or members on the other mating surface on the second manifold member can be called by any name, so long as they have a size, shape, configuration and depth similar to the raised members(s). In the embodiment where a bonding material is not utilized, then the mating raised and recess member prefer should be substantially the same dimensionally. However, if a bonding material is to be utilized, then a gap or space on the order of 0.001-0.010 inches is preferably provided between one or more of the mating surfaces on the raised and recess members.

While particular embodiments of the invention have been shown and described, numerous variations and alternative embodiments will occur to those skilled in the arm. Accordingly, it is intended that the invention be limited only in terms of the appended claims.

What is claimed is:

1. A two-piece hot runner manifold for injection molding plastic materials, the manifold comprising:
   a first manifold member having a first mating surface;
   a second manifold member having a second mating surface;
   said first and second surfaces mating together to form said two-piece manifold;
   said first and second surfaces each having portions of melt flow channels formed therein;
   said first surface having at least one raised member formed thereon and said second surface having at least one recess formed therein for mating with said raised member;
   wherein when said first and second manifold members are mated together to form said hot runner manifold, said portions of melt flow channels are mated together forming complete melt flow channels and said at least one raised member is positioned in said recess;
   said raised member and said recess having a space inbetween; and
   a bonding material positioned in said space.

2. The hot runner manifold as described in claim 1 further comprising at least one cross-pin member positioned in said first and second manifold members to assist in securing said manifold members together.

3. The hot runner manifold as described in claim 2 wherein said cross-pin member is made from a material which has a greater degree of expansion relative to the material utilized to form the first and second manifold members.

4. The hot runner manifold as described in claim 1 wherein a plurality of raised members are formed on said first manifold member and a plurality of mating recesses are formed on said second manifold member.

5. The hot runner manifold as described in claim 4 further comprising at least two pin members positioned in said first and second manifold members to assist in securing said manifold members together.

6. The hot runner manifold as described in claim 1 wherein said raised member has a stepped configuration.

7. The hot runner manifold as described in claim 1 wherein said bonding material is a bronze or copper material.

8. The hot runner manifold as described in claim 1 wherein said first and second surfaces are mated together without any gaps adjacent said portions of melt flow channels and are spaced apart only adjacent said mating raised member and recess.

9. The hot runner manifold as described in claim 1 wherein said space between said raised member and recess is in the range from 0.001-0.010 inches.

10. A two-piece hot runner manifold for injection molding plastic materials, the manifold comprising:
    a first manifold member having a first mating surface;
    a second manifold member having a second mating surface;
    said first and second surfaces mating together to form said two-piece manifold;
    at least one cross-pin member positioned substantially parallel to said first and second surfaces;
    said first and second surfaces each having portions of melt flow channels formed therein;
    said first surface having a plurality of protrusion members formed thereon and said second surface having a corresponding number of mating recess members formed therein;
    wherein when said first and second manifold members are mated together to form said hot runner manifold, said portions of melt flow channels are mated together forming complete melt flow channels and each of said protrusion members is positioned in one of said recess members;
    wherein said cross-pin member is positioned to extend through at least one mating protrusion member and recess member in said first and second manifold members to assist in securing said manifold members together;
    a space formed between at least one of the mating protrusion and recess members; and
    a bonding material positioned in said space.

11. The two-piece hot runner manifold as described in claim 10 wherein a plurality of cross-pin members are provided, each of said cross-pin members extending through at least one of said mated protrusion and recess members.

12. The hot runner manifold as described in claim 10 wherein said cross-pin member is made from a material which has a greater degree of expansion relative to the material utilized to form the first and second manifold members.

13. The hot runner manifold as described in claim 10 wherein said bonding material is a bronze or copper material.

14. The hot runner manifold as described in claim 10 wherein said first and second surfaces are mated together without any gaps adjacent said portions of melt flow channels and are spaced apart adjacent each of said mating protrusion and recess members, and wherein bonding material is positioned in a plurality of said spaced apart areas.

15. The hot runner manifold as described in claim 14, wherein a plurality of said spaced apart areas are in the range from 0.001-0.010 inches.

16. A two piece hot runner manifold for injection molding plastic materials, the manifold comprising:
    a first manifold member having a first mating surface;
    a second manifold member having a second mating surface
    said first and second surfaces mating together to form said two-piece manifold;
    said first and second surfaces each having portions of melt flow channels formed therein;
    said first surface having at least one raised member formed thereon and said second surface having at least one recess formed therein for mating with said raised member;
    wherein when said first and second manifold members are mated together to form said hot runner manifold, said portions of melt flow channels are mated together forming complete melt flow channels and said at least one raised member is positioned in said at least one recess; and
    at least one pin member positioned in said first and second manifold members, said pin member positioned substantially parallel to said first and second surfaces and positioned to extend through said raised member and said recess.

17. The hot runner manifold as described in claim 16 wherein said cross-pin member is made from a material which has a greater degree of expansion relative to the material utilized to form the first and second manifold members.

18. The hot runner manifold as described in claim 16, wherein a plurality of raised members are formed on said first manifold member and a plurality of mating recesses are formed on said second manifold member.

19. The hot runner manifold as described in claim 18 wherein a plurality of pin members are provided, each of said pin members positioned to extend through at least one mating raised member and recess.

20. The hot runner manifold as described in claim 16 further comprising a space formed between said raised member and said recess and with a bonding material positioned in said space.

21. The hot runner manifold as described in claim 20 wherein said bonding material is a bronze or copper material.

22. The hot runner manifold as described in claim 20 wherein said space is in the range between 0.001-0.010 inches.

23. The hot runner manifold as described in claim 16 wherein said raised member has a configuration selected from the group comprising a post member, a step member, an elongated ridge member, a knob member, a rod member, a cylinder member, a boss member, a square-shaped member, and a hexagon shaped member.

* * * * *